(12) United States Patent
Cournoyer

(10) Patent No.: US 12,097,430 B2
(45) Date of Patent: Sep. 24, 2024

(54) METHODS AND SYSTEMS FOR GENERATING AND MANAGING ACTIVE OBJECTS IN VIDEO GAMES

(71) Applicant: Activision Publishing, Inc., Santa Monica, CA (US)

(72) Inventor: Simon Cournoyer, Woodland Hills, CA (US)

(73) Assignee: Activision Publishing, Inc., Santa Monica, CA (US)

(*) Notice: Subject to any disclaimer, the term of this patent is extended or adjusted under 35 U.S.C. 154(b) by 159 days.

(21) Appl. No.: 17/645,861

(22) Filed: Dec. 23, 2021

(65) Prior Publication Data
US 2022/0203238 A1 Jun. 30, 2022

Related U.S. Application Data

(60) Provisional application No. 63/131,004, filed on Dec. 28, 2020.

(51) Int. Cl.
*A63F 13/00* (2014.01)
*A63F 13/57* (2014.01)
*A63F 13/58* (2014.01)

(52) U.S. Cl.
CPC .............. *A63F 13/57* (2014.09); *A63F 13/58* (2014.09); *A63F 2300/64* (2013.01); *A63F 2300/65* (2013.01)

(58) Field of Classification Search
CPC ........ A63F 13/822; A63F 13/35; A63F 13/79; A63F 13/69; A63F 13/52; A63F 13/67; A63F 13/45; A63F 13/795; A63F 13/55; A63F 13/58; A63F 13/00; A63F 13/57
See application file for complete search history.

(56) References Cited

U.S. PATENT DOCUMENTS

| | | |
|---|---|---|
| 5,530,796 A | 6/1996 | Wang |
| 5,561,736 A | 10/1996 | Moore |
| 5,563,946 A | 10/1996 | Cooper |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — David L Lewis
*Assistant Examiner* — Eric M Thomas
(74) *Attorney, Agent, or Firm* — Novel IP

(57) ABSTRACT

A method of managing evolution of an active object in a game space based on interaction of one or more players with the active object, the method including the following steps implemented concurrently and independently by server-side and client-side modules: acquiring data indicative of a first player's interaction with the active object during gameplay; determining data indicative of a first state of the active object and data indicative of a first attribute associated with the first state; determining altered state data indicative of a second state of the active object, wherein a second attribute is associated with the second state; and determining evolved object data indicative of a change from the first attribute to the second attribute. Further, the client-side module uses the evolved object data to render the active object on the first player's client device in the second state and the second attribute.

16 Claims, 7 Drawing Sheets

(56) References Cited

U.S. PATENT DOCUMENTS

| | | |
|---|---|---|
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | Bruce |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |

(56) References Cited

U.S. PATENT DOCUMENTS

| | | |
|---|---|---|
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | Bruce |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2007/0087798 A1* | 4/2007 | McGucken ............. A63F 13/45 463/1 |
| 2007/0238499 A1* | 10/2007 | Wright ................... A63F 13/12 463/1 |
| 2007/0298886 A1* | 12/2007 | Aguilar, Jr. ............. G07F 17/32 463/42 |
| 2009/0113448 A1 | 4/2009 | Smith |
| 2014/0024464 A1* | 1/2014 | Belakovsky ............ A63F 13/60 463/43 |
| 2014/0344725 A1 | 11/2014 | Bates |
| 2016/0191671 A1 | 6/2016 | Dawson |
| 2016/0279522 A1* | 9/2016 | de Plater ................ A63F 13/58 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |

(56) References Cited

FOREIGN PATENT DOCUMENTS

| | | |
|---|---|---|
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

\* cited by examiner

Active Objects Table (200a)

| Active Object | State 1 | State 2 | State 3 | Location | Time or Event of Spawning |
|---|---|---|---|---|---|
| Coins | All coins available for acquisition | Lower number of coins available for acquisition | No coins available for acquisition | $X_C, Y_C$ | $E_1$ |
| Window | Intact | Broken | | $X_W, Y_W$ | $E_2$ |

Coins attributes Table (200b)

| States | Attribute |
|---|---|
| State 1 | Sparkling with high color intensity |
| State 2 | Sparkling with Medium color intensity |
| State 3 | Inactive and grayed out |

Window attributes Table (200c)

| States | Attribute |
|---|---|
| State 1 | Reflects light and blocks view through the window |
| State 2 | Crackles and allows viewing through the window |

420
A server-side module acquires data indicative of a player's in-game inputs, responses and interactions with an active object during gameplay

424
The server-side module determines altered state data indicative of a next or second state of the active object resulting from the player's in-game inputs, responses and interactions with the active object

426
The server-side module sends the altered state data to the player's client device as well as to all other player's client devices

428
The server-side and client-side AO modules, concurrently and independently, determine evolved object data (based on the altered state data) indicative of a change from a first attribute or trait to a second attribute or trait

430
The client-side AO module uses the evolved object data to render the active object in the second state with the associated second attribute or trait

FIG. 4B

METHODS AND SYSTEMS FOR GENERATING AND MANAGING ACTIVE OBJECTS IN VIDEO GAMES

CROSS-REFERENCE

The present application relies on, for priority, U.S. Patent Provisional Application No. 63/131,004, titled "Methods and Systems for Generating and Managing Active Objects in Video Games" and filed on Dec. 28, 2020. The above-referenced application is herein incorporated by reference in its entirety.

FIELD

The present specification is related generally to the field of video games and graphics processing. More specifically the present specification is related to efficiently managing transition of states and attributes of active objects during a gaming session of a multiplayer video game.

BACKGROUND

Active objects are game assets with which a player can interact during gameplay. Active objects have one or more associated states that may change based on the progress of the game. As an active object's state transitions, the object's behavioral, visual and/or functional characteristics may change.

As video games become increasingly complex and large scale, game levels and worlds have evolved to include an increasing number of active objects. This increase requires a corresponding increase in a gaming platform's computational and data storage requirements.

Accordingly, there is a need for systems and methods that improve the tracking, updating, and transitioning of active objects' states and attributes and the managing of such states and attributes between a game server and client devices. There is also a need for reducing the amount of data exchanged between the game server and the client devices pertaining to active object states and attributes as a result of players' interactions with the active objects. Finally, there is a need for generating and managing the states and attributes of active objects such that a rich and data-dense amount of information can be used to characterize an active object while not unduly overburdening the processing and/or bandwidth requirements of executing the video game.

SUMMARY

The following embodiments and aspects thereof are described and illustrated in conjunction with systems, tools and methods, which are meant to be exemplary and illustrative, not limiting in scope. The present application discloses numerous embodiments.

In some embodiments, the present specification discloses a method of managing a scriptable object in a game space of a multi-player video game based on interactions of a player with the scriptable object via a client-side device, wherein the multi-player video game is hosted by at least one server, wherein the at least one server is configured to execute a server-side module and wherein the client-side device is configured to execute a client-side module, the method comprising: acquiring, by the server-side module and by the client-side module, data indicative of the player's interaction with the scriptable object during a game session of the multi-player video game, wherein the scriptable object comprises a first portion tracked by the server-side module and a second portion tracked by the client-side module; determining, by the server-side module, data indicative of an initial state of the first portion and, by the client-side module, data indicative of an initial state of the second portion; determining, by the server-side module, first altered state data indicative of a next state of the first portion and, by the client-side module, second altered state data indicative of a next state of the second portion; determining, by the server-side module, first evolved object data of the first portion and, by the client-side module, second evolved object data of the second portion; and rendering, by the client-side module, an updated scriptable object based on the first evolved object data and the second evolved object data.

Optionally, the initial state of the first portion has an associated first initial attribute and the next state of the first portion has an associated first next attribute, and wherein the initial state of the second portion has an associated second initial attribute and the next state of the second portion has an associated second next attribute.

Optionally, the evolved object data of the first portion is indicative of a change from the first initial attribute to the first next attribute of the first portion, and wherein the evolved object data of the second portion is indicative of a change from the second initial attribute to the second next attribute of the second portion.

Optionally, the altered state data of the first portion and the altered state data of the second portion is determined based on the player's interaction with the scriptable object.

Optionally, rendering of the second portion is performed if the player's location is determined, by the client-side module, to be proximal to a location of the scriptable object in the game space.

Optionally, rendering of the first portion is performed if the server-side module sends the altered state data of the first portion to the client-side module.

Optionally, the evolved object data of the first portion and the evolved object data of the second portion are representative of an evolution of at least one of a behavioral, visual or functional characteristic of the scriptable object.

In some embodiments, the present specification discloses a method of managing a change in an active object in a game space of a multi-player video game based on an interaction of a player with the active object, wherein the multi-player video game is hosted by at least one server and is configured to be at least partially executed on a client device controlled by the player, wherein the at least one server executes is configured to execute a server-side module, and wherein the client device is configured to execute a client-side module, the method comprising: acquiring, by the server-side module, data indicative of the player's interaction with the active object during a gameplay session of the multi-player video game; determining, by the server-side module, data indicative of a first state of the active object and data indicative of a first attribute associated with the first state; determining, by the server-side module, altered state data indicative of a second state of the active object, wherein a second attribute is associated with the second state; sending, by the server-side module, said altered state data to the player's client device; determining, concurrently and independently by both the server-side module and the client-side module, evolved object data indicative of a change from the first attribute to the second attribute; and rendering, by the client-side module, the active object in the second state and the second attribute using said evolved object data.

Optionally, the active object has associated therewith a plurality of states that are owned by the server-side module, and wherein each of said plurality of states has associated at least one attribute.

Optionally, the active object contains data indicative of the first state and the second state along with data defining the first attribute and the second attribute, and wherein execution of said programmatic instructions determines said evolved object data.

Optionally, the altered state data is determined based on the player's interaction with the active object.

Optionally, the evolved object data is representative of an evolution of at least one of a behavioral, visual or functional characteristic of the active object.

Optionally, the method further comprises sending, by the server-side module, the altered state data to a client-side module of a client device controlled by a second player; determining, by the client-side module on the second player's client device, said evolved object data; and rendering, by the client-side module on the second player's client device, the active object on the second player's client device using said evolved object data.

Optionally, a location of a virtual character controlled by the second player is proximal to a location of the active object within the game space.

In some embodiments, the present specification discloses a method of managing an evolution of an active object in a game space of a multi-player video game based on interactions of one or more players with the active object, said one or more players using respective client devices to be in data communication with at least one server that implements the game space on each of the client devices, wherein the at least one server executes a server-side module and each of the client devices executes a client-side module, the method comprising: acquiring, by a client-side module configured to execute on one or more client devices controlled by the one or more players, data indicative of one of the one or more players' interaction with the active object during gameplay; determining, by the client-side module, data indicative of a first state of the active object and data indicative of a first attribute associated with the first state; determining, by the client-side module, altered state data indicative of a second state of the active object, wherein a second attribute is associated with the second state; determining, by the client-side module independent of the server-side module, evolved object data indicative of a change from the first attribute to the second attribute; and using said evolved object data, by the client-side module, to render the active object on the client device in the second state and the second attribute.

Optionally, the client-side module renders the active object only if the one of the one or more players is located proximal to the active object in the game space.

Optionally, the active object contains data indicative of the first state and the second state along with data defining the first attribute and the second attribute, and wherein the evolved object data is determined therefrom.

Optionally, the altered state data is determined based on the one of the one or more player's interaction with the active object.

Optionally, the evolved object data is representative of an evolution of at least one of a behavioral, visual or functional characteristic of the active object.

Optionally, the first state and second state of the active object are controlled by the client-side module.

In some embodiments, the present specification discloses a computer-implemented method of spawning and activating a scriptable object in a game space for multiple players, each of said multiple players using respective client devices to be in data communication with at least one server that simulates the game space on each of the client devices, wherein the at least one server executes a server-side module and each of the client devices executes a client-side module, the method comprising: generating, by the server-side module, data indicative of a seed associated with the scriptable object; communicating, by the server-side module, said data indicative of said seed to a player's client-side module; acquiring, by the player's client-side module, data indicative of a first location of the player in the game space during gameplay; receiving and interpreting, by the player's client-side module, said data indicative of said seed to generate an identification of the scriptable object, a first condition for spawning the scriptable object and a second location in the game space for spawning the scriptable object; spawning, by the player's client-side module, the scriptable object at the second location if the first condition is fulfilled; and activating, by the player's client-side module, the spawned scriptable object if a second condition is fulfilled.

Optionally, the seed is a randomly generated numeric or alphanumeric vector.

Optionally, the numeric or alphanumeric vector is of 32 bits.

Optionally, the activating is based on at least one state and attribute associated with the scriptable object.

Optionally, the scriptable object is not spawned and the seed is discarded by the client-side module if the first condition is not fulfilled.

Optionally, the second condition is fulfilled if the first location is proximal to the second location.

Optionally, the spawned object is not activated if the second condition is not fulfilled.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 2 illustrates exemplary database tables configured to organize and store a plurality of data related to active objects, in accordance with some embodiments of the present specification;

FIG. 4B is a flowchart of a plurality of exemplary steps of a second method of managing states and evolution of active objects in a game space, in accordance with some embodiments of the present specification;

DETAILED DESCRIPTION

Figure 1:
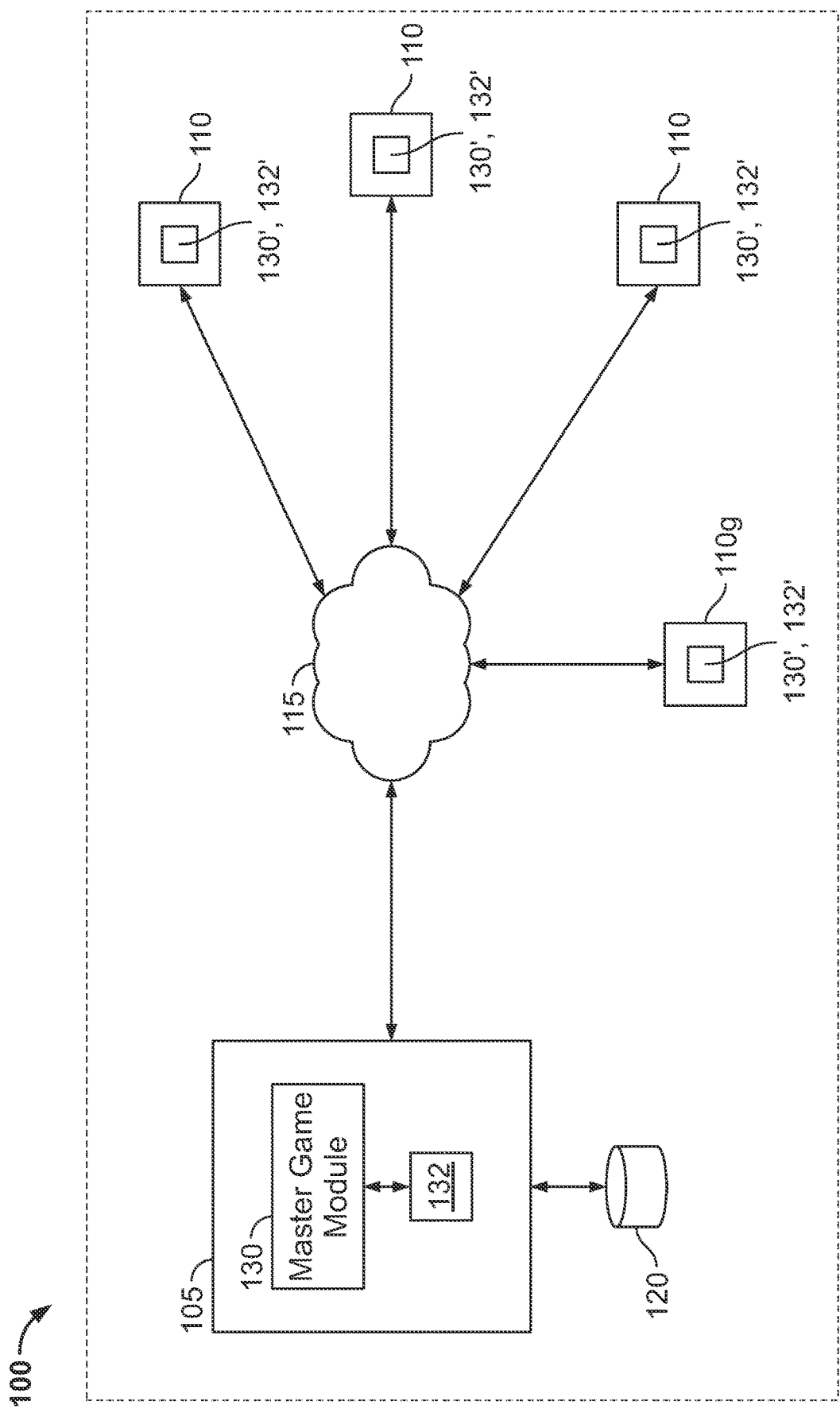
FIG. 1 is a block diagram illustration of a multi-player online gaming system or environment, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "a multi-player online gaming environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

FIG. 1 illustrates an embodiment of a multi-player online gaming or massively multiplayer online gaming system/environment 100 in which the systems and methods of the present specification may be implemented or executed. The system 100 comprises client-server architecture, where one or more game servers 105 are in communication with one or more client devices 110 over a network 115. Players and non-players, such as computer graphics artists or designers, may access the system 100 via the one or more client devices 110. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 120. The database system 120 stores a plurality of game data (and game files) associated with at least one game that is served or provided to the client devices 110 over the network 115. In some embodiments, the one or more game servers 105 may be implemented by a cloud of computing platforms operating together as game servers 105.

In accordance with aspects of the present specification, the one or more game servers 105 provide or implement a plurality of modules or engines such as, but not limited to, a master game module 130 and a server-side active object (AO) module 132. The one or more client devices 110 are configured to implement or execute one or more of a plurality of client-side modules some of which are same as or similar to the modules of the one or more game servers 105. In some embodiments each of the player and non-player client devices 110 executes a client-side game module 130' (also referred to as—client game module 130') that integrates a client-side active object (AO) module 132'.

In some embodiments, the at least one non-player client device 110g is used by an administrator to log into the one or more game servers 105 (via the client game module 130') and execute the module 132 on the server to generate one or more GUIs that enable the administrator to define and associate one or more states and attributes to an active object. It should be appreciated that the administrator includes computer graphics designers or artists, members of visual effects teams, gameplay engineers and any other non-player personnel responsible for design and development of the game.

While various aspects of the present specification are being described with reference to functionalities or programming distributed across modules or engines 130 and 132, it should be appreciated that, in some embodiments, some or all of the functionalities or programming associated with these modules or engines may be integrated within fewer modules or in a single module—such as, for example, in the master game module 130 itself on the server side and integrating the module 132' in the client gaming module 130' on the client side.

In embodiments, the master game module 130 is configured to execute an instance of an online game to facilitate interaction of the players with the game. In embodiments, the instance of the game executed may be synchronous, asynchronous, and/or semi-synchronous. The master game module 130 controls aspects of the game for all players and receives and processes each player's input in the game. In other words, the master game module 130 hosts the online game for all players, receives game data from the client devices 110 and transmits updates to all client devices 110 based on the received game data so that the game, on each of the client devices 110, reflects the interactions of all players with the game. Thus, the master game module 130 transmits game data over the network 115 to the client devices 110 for use and rendering by the game module 130' to provide local versions and current status of the game to the players.

On the client-side, each of the one or more player client devices 110 implements the game module 130' that operates as a gaming application to provide a player with an interface between the player and the game. The game module 130' generates the interface to render a virtual environment, virtual space, game space, map or virtual world associated with the game and enables the player to interact in the virtual environment to perform a plurality of game and other tasks and objectives. The game module 130' accesses at least a portion of game data, received from the game server 105, to provide an accurate representation of the game to the player. The game module 130' captures and processes player inputs and interactions within the virtual world or environment and provides at least a portion as updates to the game server 110 over the network 115.

The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations. In some embodiments, a plurality of data associated with or corresponding to active objects is stored or built-in to the game's memory space (allocated at one or both the server-side and the client side) and is initialized by loading in the game space or map data as part of the game's payload.

In accordance with aspects of the present specification, at least some active objects are game assets with which a player can interact during gameplay. Persons of ordinary skill in the art should appreciate that not all active objects can be interacted with and there are many assets that are part of the virtual game world without requiring direct interaction. An active object has associated therewith one or more states that can change based on the progress of the game and/or an interaction of the player with the active object. In embodiments, each of the one or more states may have associated one or more attributes or traits that determine behavioral characteristics of the active object in each of the one or more states. Non-limiting examples of active objects include loot items, loot boxes, doors, weapons, cars, vehicles, windows, and other characters.

In embodiments, active objects may be of a first type, referred to as random objects, or of a second type, referred to as non-random objects. Random objects have traits, timings, and/or game space locations which are left to chance. Specifically, random objects are randomly or pseudo-randomly generated and spawned during the game. A non-limiting example of random objects is "loot" such as coins, reward points, skills, weapons, armors, or other treasure.

Non-random objects are programmed to be spawned at specific game space locations at specific times and have specific attributes or traits. Thus, designers may determine that specific locations in the game space should have a particular object associated with it. For example, a car may be parked at a predefined coordinate location, an avatar may be hiding at a specific coordinate location or a door may be positioned at a specific coordinate location (in game space) such as one corresponding to an entry to a castle.

Active objects, whether random or non-random, may be characterized by one or more states reflecting attributes or traits of the object. Generally, game designers will design objects to have those states that are relevant to game play. For example, a door object may have a first state corresponding to the door being closed and a second state corresponding to the door being open. The first state may have an associated attribute or trait that the closed door may glimmer or glow. The second state may have an associated attribute or trait that the opened door may be grayed out or that the glimmer/glow is eliminated.

A game space or map may have a multitude of nodes or locations defined using coordinates. Each of these nodes or locations may spawn random or non-random objects depending at least upon one or more objects and/or progress of the game. At an initialization of game play, therefore, the initial game space may have random objects and non-random objects allocated at defined coordinate locations in the game space. Each of the random and non-random objects may have associated one or more states. In an example, for a random loot object a first state may correspond to the loot existing and a second state may correspond to the loot having been picked up. For a non-random window object a first state may correspond to the window being intact and a second state may correspond to the window being broken. Each object state may have one or more associated attributes or traits. For example, if the loot is in the first state then the loot object may visually sparkle and/or spin (an attribute or trait) whereas if the loot is in the second state then the loot object may visually appear to be grayed out (an attribute or trait). The window object in the first state may reflect (an attribute or trait) whereas in the second state it may crackle (an attribute or trait).

In some embodiments, the database system 120 stores a plurality of data organized into one or more data structures or schemas such as, for example, database tables. In embodiments, the server-side AO module 132 implements a plurality of programmatic instructions or code to access, query and update, during gameplay, the plurality of data organized into the one or more database tables.

FIG. 2 illustrates exemplary database tables configured to organize and store a plurality of data related to active objects, in accordance with some embodiments of the present specification. A first database table 200a stores a first plurality of data related to one or more active objects. For example, in the table 200a a first active object (coins) 202 has associated data indicative of first, second and third states 204, 206, and 208. Data for the first state 204 indicates that all coins are available for acquiring by a player, data for the second state 206 indicates that a lower number of coins are available for acquiring by the player (because some of the coins may already have been won or acquired by another player), and data for the third state 208 indicates that no coins are available (since all coins have already been acquired by other players). The first active object 202 also has associated data indicative of a location 210 and at least one event 212. Data for the location 212 indicates the game space node or coordinates at which the active object 202 should be generated. Data for the event 212 indicates a condition or criteria, for example, that must be satisfied for the active object 202 to be generated at the location 210.

A second database table 200b stores a second plurality of data related to at least one attribute or trait associated with each of the first, second and third states 204, 206 and 208 of the first active object 202. For example, data for attribute 214 associated with the first state 204 indicates that in the first state the coins should visually sparkle with high color intensity, data for attribute 216 associated with the second state 206 indicates that in the second state the coins should visually sparkle with medium color intensity and data for attribute 218 associated with the third state 208 indicates that in the third state the coins should appear visually inactive and grayed out.

Similarly, as shown in the first database table 200a, a second active object (window) 215 has associated data indicative of first and second states 217 and 219. Data for the first state 217 indicates that the window is intact or unbroken while data for the second state 219 indicates that the window is broken or shattered. The second active object 215 also has associated data indicative of a location 221 and at least one event 223. A third database table 200c stores a third plurality of data related to at least one attribute or trait associated with each of the first and second states 217, 219 of the second active object 215. For example, data for attribute 225 associated with the first state 217 indicates that in the first state the window should reflect light and prevent viewing through the window, and data for attribute 227 associated with the second state 219 indicates that in the second state the window should crackle and allow viewing through the window.

Each of the first and second active objects 202, 215 may be further uniquely identified by a primary key (a unique alphanumeric or numeric ID) in the table 200a. It should be appreciated that the database tables 200a, 200b and 200c are exemplary and that the same data may be organized into different schemas.

In some embodiments, for example, the plurality of data pertaining to active objects is organized and stored in the memory space of the game, for example, as part of game files, and initialized by loading in the game level or map data which is part of the game's payload. In some embodiments, the plurality of data pertaining to active objects is organized into following groups:

Read-only data present in game files, which defines the attributes, traits or behaviors of each type of object (one definition per type, not per instance);

Read only data present in the game files that defines the properties of each instance—their type, position (or coordinates), and sometimes additional information like name or variants;

Runtime mutable data that represents the current state an object is in, typically 0 at the start. In every frame, that state is used to tick a state machine based on the read-only data; and Runtime mutable data that represents some of the major properties of the object instances—their position, model, collision, etc.

In some embodiments, an active object (with which a player is allowed to interact) may have at least first and second parts wherein each part may be owned and tracked concurrently and independently. For example, the first part and the states as well as attributes related thereto may be owned and tracked by the server-side AO module 132 while the second part and the states as well as attributes related thereto may be owned and tracked by the client-side AO module 132'. The first and second parts may be respectively tracked by the server-side and client-side modules concurrently and independently.

Figure 3:
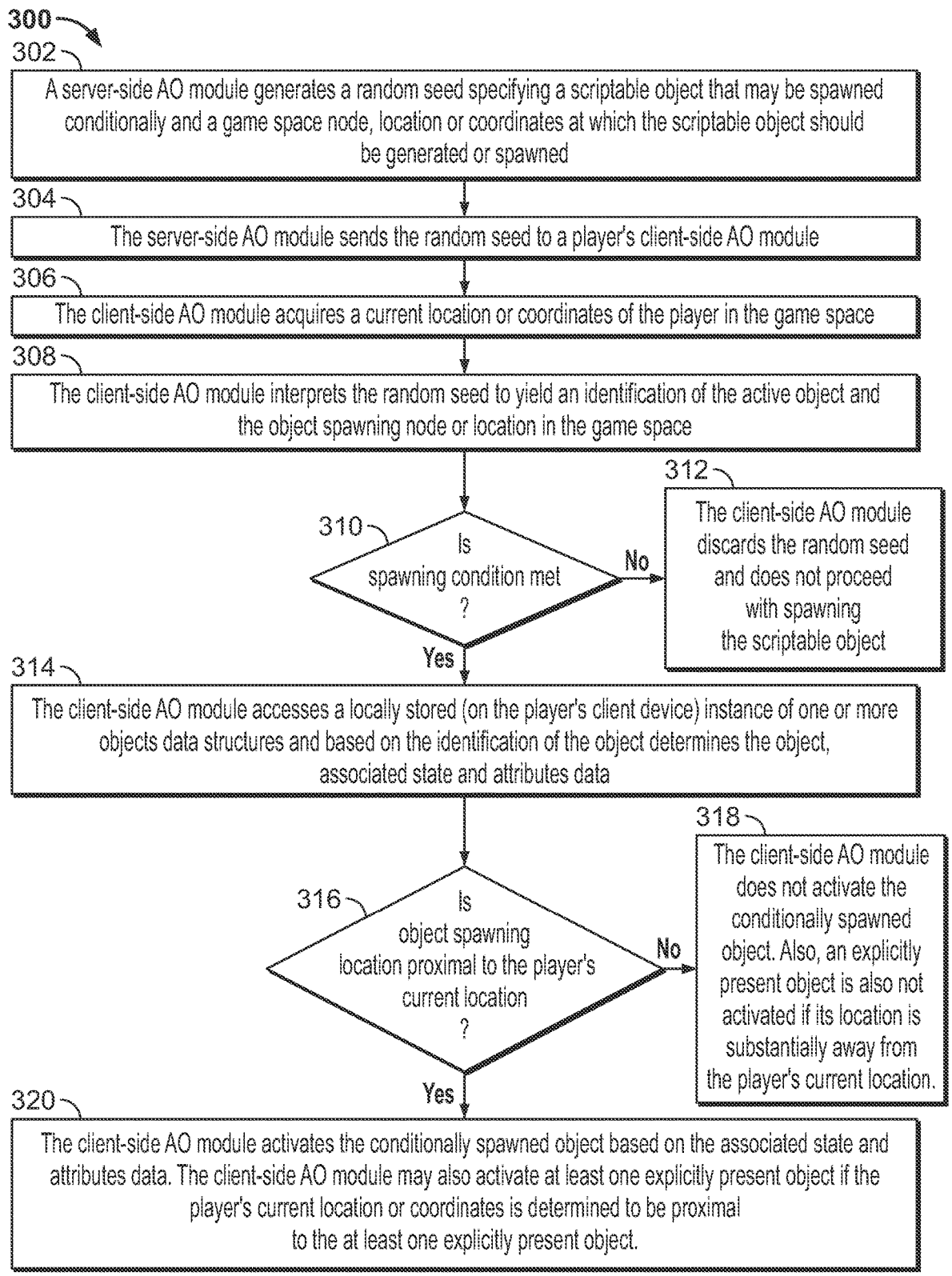
FIG. 3 is a flowchart of a plurality of exemplary steps of a method of procedural generation or spawning and activation of a scriptable/active object in a game space or map, in accordance with some embodiments of the present specification.

FIG. 3 is a flowchart of a plurality of exemplary steps of a method 300 of procedural generation or spawning and activation of a scriptable/active object in a game space or map, in accordance with some embodiments of the present specification. In some embodiments, the method 300 is implemented by the server-side and client-side modules 132, 132' within the system 100 of FIG. 1. As known to persons of ordinary skill in the art, scriptable objects can either be placed in a game space or map by a computer graphics designer or artist, for example, or may be spawned at runtime based on gameplay logic. When placed in the game space or map, the scriptable objects are either conditionally spawned (for example, loot) and/or just explicitly present (for example, doors, a destructible). In embodiments, the conditionally spawned scriptable objects are randomly generated in client devices based on a seed generated and sent to the client devices by the server.

At step 302, the server-side AO module 132 generates a random (or pseudorandom) seed specifying or identifying a scriptable object that may be spawned conditionally and a game space node, location or coordinates at which the scriptable object should be generated or spawned. In some embodiments, the random seed is a short numeric or alphanumeric vector of 'n' bits that is randomly generated. In some embodiments, the random seed is a 32-bit vector.

It should be appreciated that apart from conditionally spawned objects, there may be one or more objects (for example, doors or waterfalls) that may be explicitly present but may be in an inactive state, in some embodiments. In some embodiments, at least some of the explicitly present objects can be interacted with by a player. State and attributes data of such explicitly present scriptable objects is accessible from the game's memory space (locally on the player' client device), in some embodiments.

At step 304, the server-side AO module 132 sends the random seed to a player's client-side AO module 132' on his client game module 130'. At step 306, the client-side AO module 132' acquires a current location or coordinates of the player in the game space. At step 308, the client-side AO module 132' interprets the random seed to yield an identification of the scriptable object, a condition (such as, for example, a predefined score being achieved or exceeded by the player, or a predefined set of hurdles or obstacles being overcome by the player) to be met for spawning the object and the object spawning node or location in the game space.

At step 310, the client-side AO module 132' determines if the spawning condition is met. If yes, then, at step 314, the scriptable object is generated or spawned at the object spawning node or location. In some embodiments, the client-side AO module 132' accesses a locally stored (on the player's client device) instance of one or more objects data structures or related game files in order to determine the scriptable object (along with associated one or more states and attributes data corresponding to the one or more states) to be rendered based on the identification of the object. It should be appreciated that, in accordance with aspects of the present specification, the object may be spawned conditionally but it may not be active (that is, the object may be spawned in an inactive state). If the spawning condition is not met then, at step 312, the random seed is discarded and the object is not spawned.

At step 316, the client-side AO module 132' compares the player's current location or coordinates with the conditionally spawned object location to determine if the conditionally spawned object location is proximal or close to the player's current location. If yes, then at step 320, the client-side AO module 132' activates the conditionally spawned object based on the associated state and attributes data. In some embodiments, the client-side AO module 132' may also activate at least one explicitly present object if the player's current location or coordinates is determined to be proximal to the at least one explicitly present object.

However, if at step 316, the client-side AO module 132' determines that the conditionally spawned object location is substantially away from the player's current location then, at step 318, the client-side AO module 132' does not activate the conditionally spawned object. Similarly, the at least one explicitly present object is also not activated if the at least one explicitly present object location is substantially away from the player's current location.

In some embodiments, activation of an object, based on associated state and attributes data, indicates that the object (conditionally spawned and/or explicitly present) is visible (that is, the object model is drawn or rendered) to the player and its states and attributes are now functional or executable. It should be appreciated that certain objects are visible from a larger distance than others (example, doors versus loot).

In some embodiments, the server-side AO module 132 receives data indicative of the player's in-game inputs and interactions with various active objects. Concurrently, the client-side AO module 132' also receives the data indicative of the player's in-game inputs and interactions with various active objects.

In accordance with some aspects of the present specification, the server-side and client-side AO modules 132, 132' concurrently and independently perform the following tasks:
  Determine an initial or first state of an active object during gameplay
  Monitor and determine on-going changes to the states of the active object as a result of the game progress and/or an interaction of the player with the active object. That is, determine if the first state has changed to a second state, the second state has changed to a third state and so on depending upon the one or more states associated with the active object.
  Determine how the active object changes, to an evolved active object, based on the new state and on at least one attribute or trait associated with the new state. For example, the player may pick up loot, causing the server-side and client-side AO modules 132, 132' to recognize an associated change from the first state to the second state. In alternate embodiments, altered state data indicative of a change from a first state to a second state is acquired by the server-side AO module 132 which then sends the altered state data to the client-side AO module 132'. Based on the altered state data, the AO modules 132, 132' concurrently and independently determine how the active object should change or evolve. It should be appreciated that the altered state data is a substantially small amount of information that is communicated between the server-side and client-side AO modules 132, 132'. In some embodiments, altered state data indicative of a change from a first state to a second state causes the AO modules 132, 132' to perform different tasks. For example, the altered state data may cause the server-side AO module 132 to make a weapon unavailable for pickup and give it to a player whereas the altered state data may cause the client-side AO module 132' to stop playing a sound that was previously playing or stop displaying a visual effect that was previously being displayed.

In some embodiments, alteration of a state of an active object is affected depending on whether the state of the active object (or a part/portion of the active object) is owned by the server-side AO module 132 or by the client-side AO module 132'. If the state of the active object is owned by the server-side AO module 132, the client-side AO module 132' changes the state of the active object only if it receives a message (related to altered state data) from the server-side AO module 132. That is, based at least on a player's interaction with an active object, the server-side AO module 132 monitors and determines on-going changes to the states of the active object, sends the altered state data to the client-side AO module 132' and thereafter both server-side and client-side AO modules 132, 132' concurrently and independently change the active object into an evolved active object based on the altered state data.

However, if the state of the active object (or a part/portion thereof) is owned by the client-side module 132', the AO module 132' goes ahead and changes the state of the active object. The altered state data for the state of the active object (or a part/portion thereof) owned by the module 132' is not communicated to other players' client devices. For example, doors have specific programmatic code associated therewith to enable the doors to be client-predicted. It should be appreciated that, in some embodiments, an active object may have first and second parts wherein the first part may be owned by the AO module 132 (in terms of state changes) and the second part may be owned by the AO module 132'. Thus, in some embodiments, data corresponding to state change of the second part (that is owned by the client-side AO module 132') is not shared or communicated to other players' client devices as part of an option to optimize performance and bandwidth use. Following are non-limiting exemplary scenarios in which the altered state data of the second part (that is owned by the client-side AO module 132') is not shared, communicated to or replicated across other players' client devices:

a) Events or situations where it is not necessary or required to keep all client devices in sync such as for non-gameplay impactful objects, clutter objects and dynamic environmental impacts or enhancements—for example, birds flocking or flying away when a player approaches them, flickering decorative lights and TV sets that can be switched on and off.
b) Cases where the server-side AO module 132 is allowed to change the state but not required to replicate that state change to any client device if it is predetermined that the state change has no impact across client devices such as, for example, if the events generated by the state change only trigger a script call back (which only exists on the server).
c) Cases where the trigger itself, for a change of state, is deterministic or close to being deterministic across all client devices. As a non-limiting example, an explosion may be a trigger for change of state of the second parts of one or more objects. The explosion being a deterministic event, all client devices can resultantly go ahead and alter the state of the second parts of the one or more objects and the altered state data (related to the one or more objects) is not required to be communicated or shared across client devices. In another non-limiting example, a player's interaction with a scriptable/active object may already be replicated across client devices as part of a shared data stream. Therefore, the system can rely on this shared data stream to impact the scriptable object (by way of state change) in a consistent manner and so the scriptable object itself does not have to redundantly replicate that state change.

It should be appreciated that, in some embodiments, graphics designers author one or more scriptable/active objects, having a second part owned by the client-side AO module 132', keeping in mind that the client-side AO module 132' may go ahead and alter the state of the second part of the scriptable/active object, not share or communicate the altered state data across other player's client devices and therefore generate a possibility of inconsistency of how the scriptable/active object is rendered across multiple client devices. Therefore, the gaming system recognizes that players who join late into the game, for example, will never have a chance to see the state changes or trigger events, and the gaming system considers that to be acceptable when the choice is made to make a part of a scriptable/active object client owned or authoritative.

Arrive at the same current or new state of the active object as well as the same evolved active object concurrently yet independently of each other.

It should be appreciated that, in some embodiments, the server-side AO module 132 has one state of the virtual world for all players. For state of an active object (or a part thereof) owned by the server-side AO module 132, the AO module 132 keeps track of what each client knows about the state of the world from the perspective of the module 132. For each frame, the server-side AO module 132 looks at its own current altered state of the active object, and sends a list of altered state data indicative of state updates to each client device for which the state does not match. In some embodiments, a predefined limit is applied on how much altered state data can be communicated in a single frame (for example, depending upon bandwidth cap) as a result of which the client devices may get slightly out of sync with the server. However, this aberration will tend to correct itself over time.

On the other hand, as described earlier, in some embodiments, altered state of an active object (or a part thereof) owned by the client-side AO module 132' is not reflected to other players' client devices. Thus, only the altered state of an active object (or a part thereof) owned by the server-side AO module 132 is replicated to all players' client devices.

For state of an active object (or a part thereof) such as, for example, a door, so long as the player's movement and actions are predicted accurately by the modules 132 and 132', both modules 132, 132' will deterministically arrive at the same final state, concurrently and independently. If a non-predicted event or element is introduced (which a client device did not anticipate) as a result of which the player is interrupted (for example, if another player gets in the way of opening the door) then the non-predicted event or element is sensed by the server-side module 132. Consequently, the module 132 is configured to correct the state of the client device (in light of the sensed non-predicted event or element) thereby causing a visible correction on the client device. Therefore, in some embodiments, for client-predicted state changes (example, for the doors) the server-side AO module 132 is still responsible for sending the modified or altered state data to client devices. In embodiments, this behavior relies on pre-existing frameworks in the master game module or engine 130 that allow for the predictive simulation of the player inputs and movement. Thus, both server-side and client-side AO modules 132, 132' are provided with a certain set of inputs and instructions to move the player. As a result of the inputs both modules 132, 132' will usually arrive at the same predicted output or conclusion. Subsequently, the client-side AO module 132' sends its predicted output (via a hash of such outputs) to the server-side AO module 132. The server-side AO module 132 determines if its own predicted output matches with the predicted output of the client-side AO module 132' and when the two predicted outputs do not match, perhaps because the inputs of the modules 132, 132' did not match, the server-side AO module 132 will correct the client-side AO module 132'. In that sense, both server-side and client-side modules 132, 132' are tasked with calculating the player's movement and actions, but the calculated movements and actions of the player by the client-side module 132' is considered as 'predicted' and that by the server-side module 132 is considered to be 'authoritative'.

In some embodiments, the server-side AO module 132 processes a player's movement and action to recognize a new state for an active object (the state of which is owned by the server-side AO module 132), generate an evolved active object based on the new state, and then send evolved object data indicative of the evolved active object back to the client game module 130' for rendering. On the other hand, the client game module 130' implements the client-side AO module 132' that either determines and implements on-going changes to the state of an active object (the state of which is owned by the client-side AO module 132') or receives, from the server-side AO module 132, altered state data for an active object (the state of which is owned by the server-side AO module 132) and concurrent to the server-side AO module 132 independently yields or generates an evolved active object.

Figure 4A:
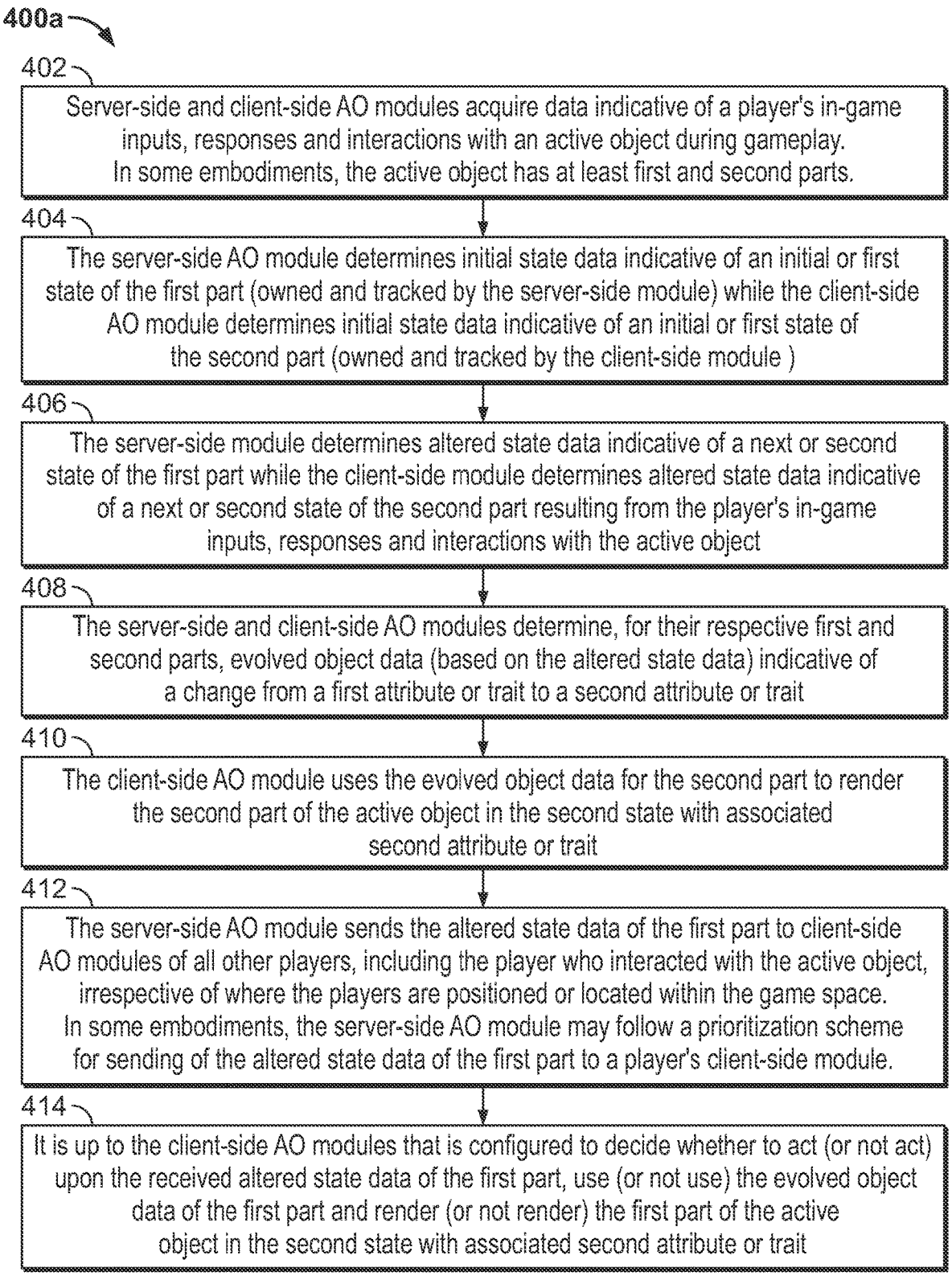
FIG. 4A is a flowchart of a plurality of exemplary steps of a first method of managing states and evolution of scriptable/active objects in a game space, in accordance with some embodiments of the present specification.

FIG. 4A is a flowchart of a plurality of exemplary steps of a method 400a of managing states and evolution of scriptable/active objects in a game space, in accordance with some embodiments of the present specification. In embodiments, each of the steps 402, 404, 406 and 408 of the method 400a are implemented, concurrently and independently, by the server-side and client-side AO modules 132, 132' in the system 100 of FIG. 1. Note that the sequences of the steps of the method 400a are exemplary and may change in alternate embodiments. For example, in some embodiments, step 412 may be performed prior to step 410.

At step 402, the server-side and client-side AO modules 132, 132' acquire data indicative of a player's in-game inputs, responses and interactions with an active object during gameplay. In some embodiments, the active object may have associated one or more states and each of the one or more states may have associated at least one attribute or trait that defines behavioral, visual and/or functional characteristics of the active object.

In some embodiments, the active object has at least first and second parts. The first part and the states as well as attributes related thereto is owned and tracked by the server-side AO module 132 while the second part and the states as well as attributes related thereto is owned and tracked by the client-side AO module 132'. The first and second parts are respectively tracked by the server-side and client-side modules concurrently and independently.

At step 404, the server-side module 132 determines initial state data indicative of an initial or first state of the first part (owned and tracked by the server-side module 132) of the active object while the client-side module 132' determines initial state data indicative of an initial or first state of the second part (owned and tracked by the client-side module 132') of the active object, from the associated one or more states. The active object may have an initial or first attribute or trait associated with each of the initial or first states of the first and second parts of the active object.

At step 406, the server-side module 132 determines altered state data indicative of a next or second state of the first part while the client-side module 132' determines altered state data indicative of a next or second state of the second part of the active object resulting from the player's in-game inputs, responses and interactions with the active object. Accordingly, a "next state" is a state that is subsequent, immediately after, or otherwise comes after, in time, the initial or first state. The active object may have a next or second attribute or trait associated with each of the next or second states of the first and second parts of the active object. Thus, the server-side and client-side AO modules 132, 132' determine, for their respective first and second parts, if a first state has changed to a second state, the second state has changed to a third state and so on depending upon the one or more states associated with each part of the active object.

At step 408, the server-side and client-side AO modules 132, 132' determine, for their respective first and second parts, evolved object data (based on the altered state data) indicative of a change from the first attribute or trait to the second attribute or trait. The change from the first to second attribute is representative of an evolution of the behavioral, visual and/or functional characteristics of each of the first and second parts of the active object. Accordingly, evolved object data is based on altered state data and is representative of a change from the first attribute or trait to the second attribute or trait.

At step 410, the client-side AO module 132' uses the evolved object data for the second part to render the second part of the active object in the second state with associated second attribute or trait. In some embodiments, altered state of the second part of the object owned by the client-side AO module 132' is not reflected to other players' client devices in order to optimize performance and bandwidth use. In some embodiments, however, the rendering of the second part is conditional and dependent at least upon a location or coordinates of the active object with reference to the player's current location or coordinates. Thus, in some embodiments, the client-side AO module 132' uses the evolved object data for the second part to render the second part of the active object in the second state with associated second attribute or trait if the player's current location or coordinates is in proximity to the location or coordinates of the active object. If not, then, in some embodiments, the client-side module 132' may not render the second part of the active object in the second state.

At step 412, the server-side AO module 132 sends the altered state data of the first part (determined at step 406) to client-side modules 132' (or client devices) of all other players (that is, players other than the player who interacted with the active object at step 402), including the player who interacted with the active object, irrespective of where the players are positioned or located within the game space.

In some embodiments, the server-side AO module 132 may follow a prioritization scheme for sending of the altered state data of the first part of the active object to a player's client-side module 132' (or client device) in case network bandwidth limit is breached at the player's client device and becomes throttled (which is an edge-case condition, typically seen for players joining late in a match).

In embodiments, the game virtual world is initially partitioned into a two dimensional (2D) grid at server startup. The size and number of grid cells depends on the size of the game map. When active objects are spawned, they are assigned to the grid cell in which they belong spatially. When the server-side AO module 132 prioritizes sending of altered state data to a player's client device (due to network bandwidth limits being breached at the player's client device), the server-side AO module 132 first sends the altered state data for the cell the player is currently located in, then the neighboring cells, then further out, until no more altered state data remains to be sent or the bandwidth capacity is met for the current frame.

In some embodiments, the client-side AO modules 132' are configured to act upon the received altered state data of the first part depending upon locations of associated players in the game space. Thus, for all players that are in locations proximal to the active object the respective client-side AO modules 132' use the received altered state data of the first part and use the evolved object data of the first part in order to change the state and implement the attributes or traits associated with the changed state of the first part of the active object. Thus, in some embodiments, the client-side AO modules 132' are configured to not act upon the received altered state data of the first part if the associated players are currently positioned or located substantially away from the position or location of the active object.

Thus, at step 414, it is up to the client-side AO module 132 that is configured to decide whether to act (or not act) upon the received altered state data of the first part, use (or not use) the evolved object data of the first part and render (or not render) the first part of the active object in the second state with associated second attribute or trait.

FIG. 4B is a flowchart of a plurality of exemplary steps of a method 400b of managing states and evolution of scriptable/active objects in a game space, in accordance with some embodiments of the present specification. In embodiments, the method 400b is implemented by the server-side and client-side AO modules 132, 132' in the system 100 of FIG. 1. In embodiments, some of the steps of the method 400b are implemented concurrently and independently by the server-side and client-side AO modules 132, 132'. The method 400b is implemented for those active objects the states for whom are owned by the server-side AO module 132 and also for those active objects that support player interaction.

At step 420, the server-side module 132 acquires data indicative of a player's in-game inputs, responses and interactions with an active object during gameplay. In various embodiments, the active object may have associated one or more states and each of the one or more states may have associated at least one attribute or trait that defines behavioral, visual and/or functional characteristics of the active object.

The initial state data indicative of an initial or first state of the active object (from the associated one or more states) is known by both the modules 132, 132' and determined based on pre-generated data that is part of the game files (typically specific to each game level). In some embodiments, the initial state data is computed by the client-side AO module 132' based on a seed received from the server-side AO module 132 in the case of a randomly generated active object. The active object may have an initial or first attribute or trait associated with the initial or first state of the active object.

At step 424, the server-side module 132 determines altered state data indicative of a next or second state of the active object resulting from the player's in-game inputs, responses and interactions with the active object. The active object may have a next or second attribute or trait associated with the next or second state of the active object. Thus, the server-side module 132 determines if a first state has changed to a second state, the second state has changed to a third state and so on depending upon the one or more states associated with the active object.

At step 426, the server-side module 132 sends the altered state data to the player's client device as well as to all other player's client devices. In some embodiments, the server-side AO module 132 may prioritize sending of altered state data to those player client devices for which the associated players are located or positioned proximal to the active object. Subsequently, the server-side AO module 132 may send the altered state data to all remaining player client devices irrespective of where the players are positioned within the game space.

At step 428, the server-side and client-side AO modules 132, 132', concurrently and independently, determine evolved object data (based on the altered state data) indicative of a change from the first attribute or trait to the second attribute or trait. The change from the first to second attribute is representative of an evolution of the behavioral, visual and/or functional characteristics of the active object.

At step 430, the client-side AO module 132' uses the evolved object data to render the active object in the second state with associated second attribute or trait.

In some embodiments, the client-side AO module 132' determines the evolved object data and uses the evolved object data to render the active object in the second state only if the player is in proximity of the active object.

Figure 4C:
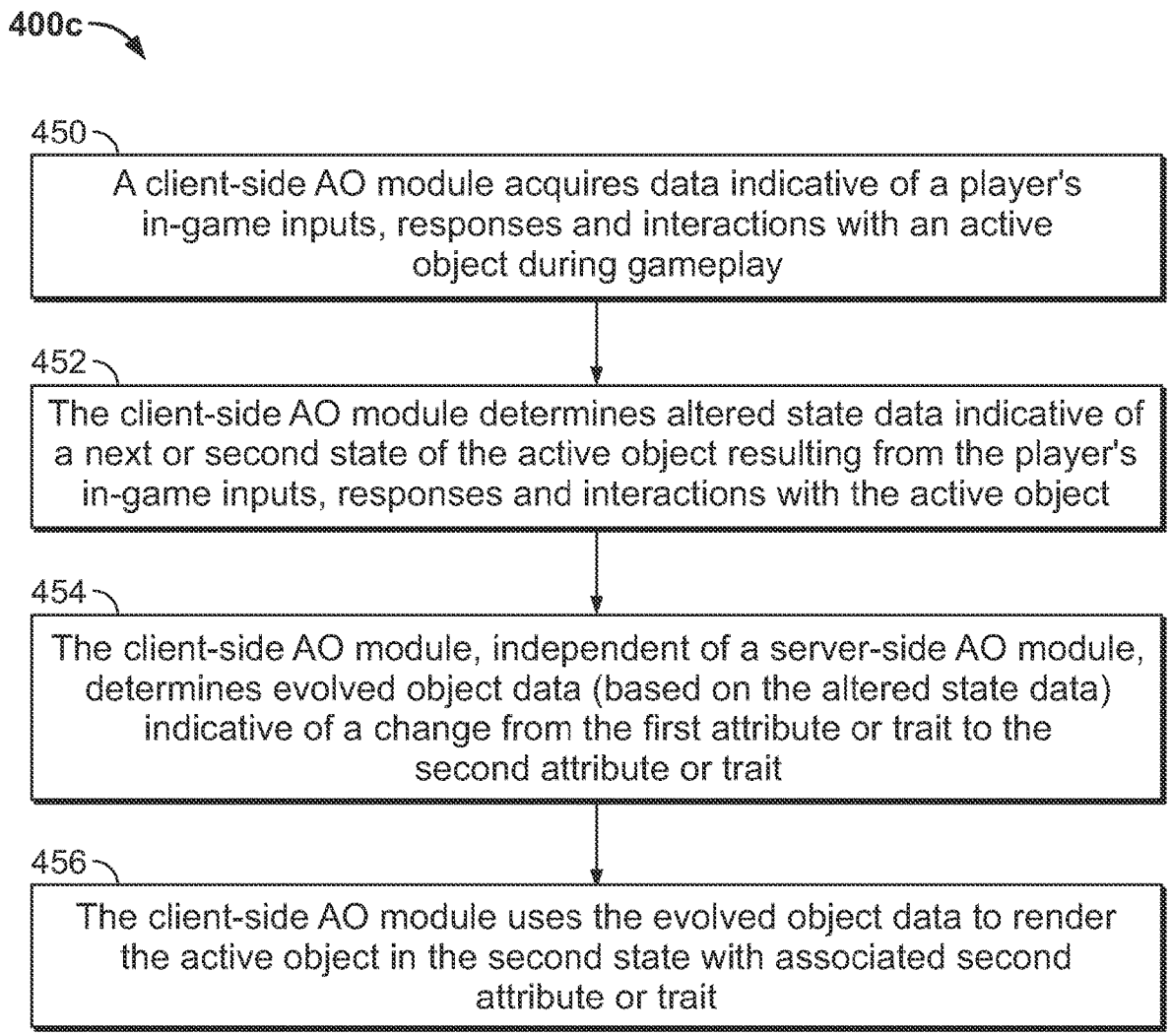
FIG. 4C is a flowchart of a plurality of exemplary steps of a third method of managing states and evolution of active objects in a game space, in accordance with some embodiments of the present specification.

FIG. 4C is a flowchart of a plurality of exemplary steps of a method 400c of managing states and evolution of scriptable/active objects in a game space, in accordance with some embodiments of the present specification. In embodiments, the method 400c is implemented by the client-side AO module 132' in the system 100 of FIG. 1. The method 400c is implemented for those active objects the states for whom are owned by the client-side AO module 132' and also for those active objects that support player interaction.

At step 450, the client-side AO module 132' acquires data indicative of a player's in-game inputs, responses and interactions with an active object during gameplay. In various embodiments, the active object may have associated one or more states and each of the one or more states may have associated at least one attribute or trait that defines behavioral, visual and/or functional characteristics of the active object.

Initial state data indicative of an initial or first state of the active object (from the associated one or more states) is known by both the modules 132, 132' and determined based on pre-generated data that is part of the game files (typically specific to each game level). In some embodiments, the initial state data is computed by the client-side AO module 132' based on a seed received from the server-side AO module 132 in the case of a randomly generated active object. The active object may have an initial or first attribute or trait associated with the initial or first state of the active object.

At step 452, the client-side AO module 132' determines altered state data indicative of a next or second state of the active object resulting from the player's in-game inputs, responses and interactions with the active object. The active object may have a next or second attribute or trait associated with the next or second state of the active object. Thus, the client-side AO module 132' determines if a first state has changed to a second state, the second state has changed to a third state and so on depending upon the one or more states associated with the active object.

At step 454, the client-side AO module 132', independent of the server-side AO module 132, determines evolved object data (based on the altered state data) indicative of a change from the first attribute or trait to the second attribute or trait. The change from the first to second attribute is representative of an evolution of the behavioral, visual and/or functional characteristics of the active object.

At step 456, the client-side AO module 132' uses the evolved object data to render the active object in the second state with associated second attribute or trait. In some embodiments, the client-side AO module 132' determines the evolved object data and uses the evolved object data to render the active object in the second state only if the player is in proximity of the active object.

It should be appreciated that, in some embodiments, the altered state data, determined at step 452, is not communicated to other players' client devices at all. In other words, the evolved object is not replicated to other players' client devices in order to optimize performance and bandwidth use.

Thus, in accordance with some aspects of the present specification, the server-side AO module 132 in data communication with the client-side AO module 132' enables efficient management of an amount of data communicated between the one or more game servers 105 and a client device 110 for desired execution and rendering of a virtual game world or game space during gameplay. In embodiments, the data managed is indicative of the game space including a plurality of active objects associated with the game space.

In various embodiments, an active object is a small bundle of data and programming code or script. A computer graphics designer or artist creates an active object in the form of a scriptable object which is a container of minimal amount of data and script. In some embodiments, the data contained in or bundled with an active object asset defines one or more states of the object (among other data such as, for example, those defining a geometric model of the object and sounds). In some embodiments, the programming code or script contained in or bundled with the active object asset defines how the active object is supposed to behave in each of the one or more states. Thus, in accordance with some aspects of the present specification, the client-side AO module 132' can interpret the data and execute the script bundled with the active object and, based on a player's interactions with the active object, determine altered state data as well as evolved object data concurrently and independently of the server-side AO module 132. Thus, the client-side AO module 132' can use script of the active object asset to effect change in behavioral, visual and/or functional characteristics of the active object asset without having to go back to the one or more game servers 105. For example, when a player fires at a window object, a corresponding event is generated and acquired by both the server-side and client-side AO modules 132, 132' thereby causing the modules 132, 132' to, concurrently and independently, execute a script bundled with the window object to determine the same result of showing the window broken.

In accordance with some aspects of the present specification, an active object only needs to be defined once, and all associated data (including data defining one or more states as well as the programming code or script defining how the active object is supposed to behave in each of the one or more states) is included in the game files and never needs to be sent from the server to the client. This enables the server-side AO module 132 to replicate or send a substantially small payload (corresponding to altered state data) to a client-side AO module 132'. In some embodiments, the payload is of a single bit when active objects have only two associated states.

Stated differently, data and scripts determining behaviors of active objects are predetermined and defined in the game files so that at runtime data exchange, related to altered state data, between the server and clients is minimized. Thus, the amount of data required to represent what state an object is in, during runtime, is minimized since behavior of the object in different states is predetermined in the game files. In contrast, prior art approach for server-scripted games is for the server to spawn and replicate (to each client) individual sounds, effects, models, etc. which can quickly add to up several KBs of bandwidth.

In accordance with some aspects of the present specification, the server-side AO module 132 generates and provides a software workflow tool to enable an administrator to define and associate one or more states to an active object and also script behavior of the active object by associating at least one attribute or trait with each of the one or more states.

Figure 5:
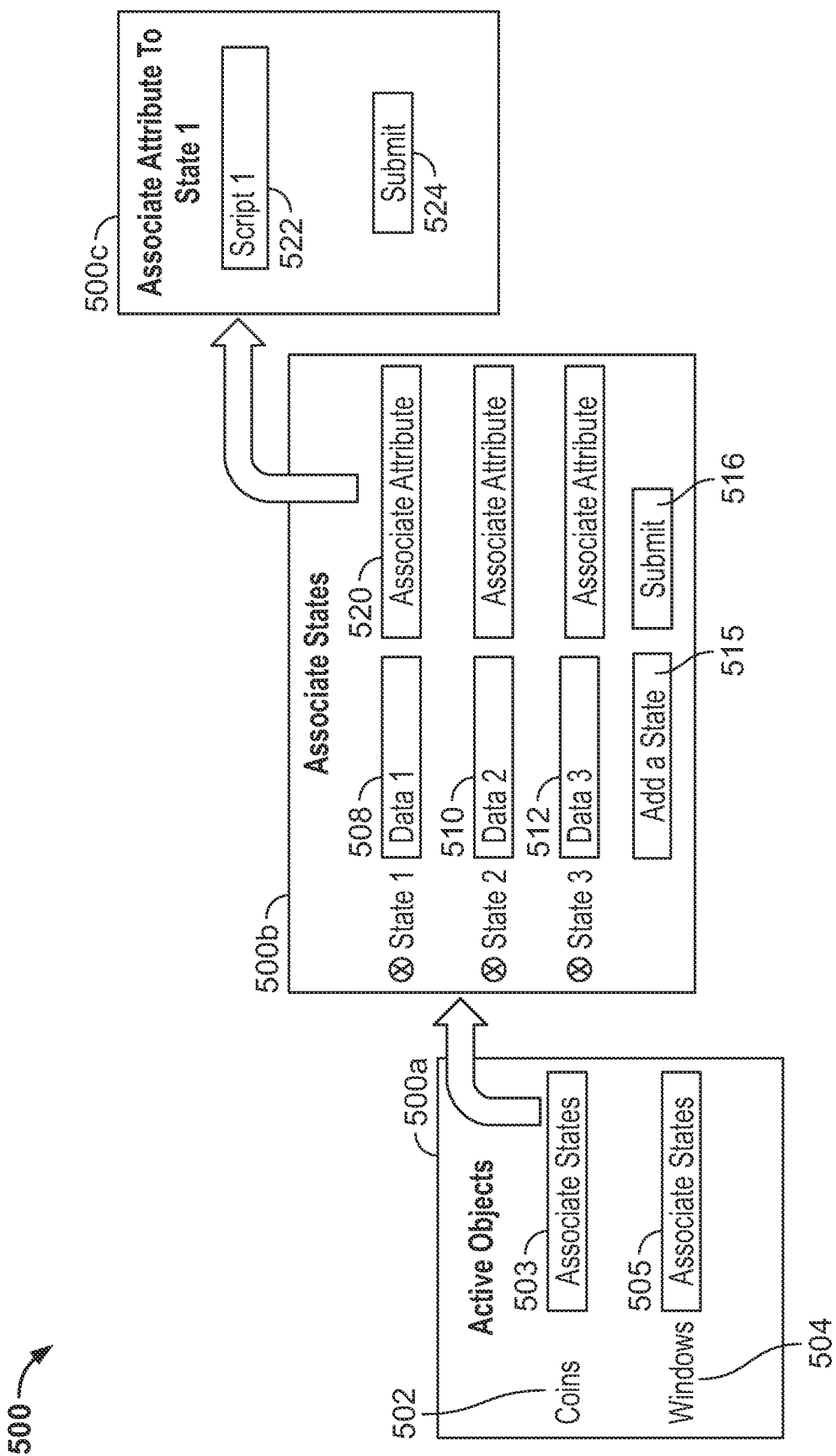
FIG. 5 illustrates a plurality of exemplary GUIs (Graphical User Interfaces) to enable an administrator to associate one or more states and attributes to an active object, in accordance with some embodiments of the present specification.

FIG. 5 illustrates a plurality of exemplary GUIs (Graphical User Interfaces) 500 to enable an administrator to associate one or more states and attributes to an active object, in accordance with some embodiments of the present specification. In some embodiments, the GUIs 500 are generated by the server-side AO module 132 in response to the administrator logging into the one or more game servers 105 using his client device 110g. It should be appreciated that the administrator includes computer graphics designers or artists, members of visual effects teams, engineers and any other non-player personnel responsible for design and development of the game.

As shown, a first interface 500a displays a first active object (coins) 502 and a second active object (windows) 504. Button icons 503, 505 when clicked cause generation of a second interface. As an example, when the first button icon 503 is enabled (clicked, for example) a second interface 500b displays first, second and third input fields 508, 510 and 512 for enabling the administrator to input or choose (from a drop down list) data indicative of first, second and third states of the first active object 502. The administrator may click on a button icon 515 to continue adding more states to the first active object 502. On actuating button icon 516, the data indicative of first, second and third states 508, 510, 512 is associated with the first active object 502 and stored in the at least one database 120 (FIG. 1).

The administrator can also associate an attribute or trait to each of the states. For example, if the administrator actuates a button icon 520 (corresponding to the first state 508) a third interface 500c is displayed. The third interface 500c displays, for example, a field 522 for enabling the administrator to input or choose (from a drop down list) programmatic code or script defining an attribute or trait to be associated with the first state 508. On clicking a submit button icon 524, the programmatic code or script defining the attribute or trait 522 is associated with the first state 508 of the first active object 502 and stored in the at least one database 120.

It should be appreciated that the GUIs 500 are only exemplary and the workflow of defining states and attributes for an active object may be implemented in fewer or more GUIs in various alternate embodiments. The GUIs 500 define a workflow that enables the administrator to define states and script behaviors of an active object in a game world and gives them the opportunity to push specific functions for client-side execution while some functions are implemented on a server.

The systems and methods of the present specification enable large scale interactability with scriptable/active object assets of the virtual world for example, loot pickups, doors, windows, destructible environment, etc. Conventionally, a server script had to make runtime decisions on what needs to be spawned dynamically and send that information to the client. This costs a significant amount of CPU, memory and network bandwidth, and limits the ability to scale. Embodiments of the present specification allow for shared knowledge of the 'interactable dynamic world' and facilitate large-scale virtual worlds by significantly reducing the amount of data required to synchronize the clients with the server (orders of magnitude less bandwidth, for example 100+ bytes down to a single byte per object).

Embodiments of the present specification also allow for a significant amount of processing during the toolchain and use an optimized pipeline at runtime that substantially reduces the CPU need to manage those objects. Rather than use interpreted designer-driven script on a single thread, embodiments of the present specification use a data-driven state machine that runs entirely native code and for which many operations are multithreaded. Embodiments of the present specification also simplify the designer's workflow by automatically activating and de-activating objects that are relevant to each individual player. Conventionally, that kind of object management would have to be managed by various custom systems written by designers and gameplay engineers.

Embodiments of the present specification further allow for up to a million interactable/active objects compared to a typical conventional limit of ~1000, with the ability to scale further.

The above examples are merely illustrative of the many applications of the systems and methods of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

I claim:

1. A method of managing a scriptable object in a game space of a multi-player video game based on interactions of a player with the scriptable object via a client-side device, wherein the multi-player video game is hosted by at least one server, wherein the at least one server is configured to execute a server-side module and wherein the client-side device is configured to execute a client-side module, the method comprising:

generating, in the server-side module, a seed and transmitting the seed to the client-side module, wherein the seed is a randomly generated alphanumeric vector of 'n' bits and wherein the scriptable object is spawned in the multi-player video game based on said seed;

acquiring, by the server-side module and by the client-side module, data indicative of the player's interaction with the scriptable object during a game session of the multi-player video game, wherein the scriptable object comprises a first portion tracked by the server-side module and a second portion tracked by the client-side module;

determining, by the server-side module, data indicative of an initial state of the first portion and, by the client-side module, data indicative of an initial state of the second portion;

determining, by the server-side module, first altered state data indicative of a next state of the first portion and, by the client-side module, second altered state data indicative of a next state of the second portion;

determining, by the server-side module, first evolved object data of the first portion and, by the client-side module, second evolved object data of the second portion; and rendering, by the client-side module, an updated scriptable object based on the first evolved object data and the second evolved object data.

2. The method of claim 1, wherein the initial state of the first portion has an associated first initial attribute and the next state of the first portion has an associated first next attribute, and wherein the initial state of the second portion has an associated second initial attribute and the next state of the second portion has an associated second next attribute.

3. The method of claim 2, wherein the evolved object data of the first portion is indicative of a change from the first initial attribute to the first next attribute of the first portion, and wherein the evolved object data of the second portion is indicative of a change from the second initial attribute to the second next attribute of the second portion.

4. The method of claim 1, wherein the altered state data of the first portion and the altered state data of the second portion is determined based on the player's interaction with the scriptable object.

5. The method of claim 1, wherein rendering of the second portion is performed if the player's location is determined, by the client-side module, to be proximal to a location of the scriptable object in the game space.

6. The method of claim 1, wherein rendering of the first portion is performed if the server-side module sends the altered state data of the first portion to the client-side module.

7. The method of claim 1, wherein the evolved object data of the first portion and the evolved object data of the second portion are representative of an evolution of at least one of a behavioral, visual or functional characteristic of the scriptable object.

8. The method of claim 1, further comprising, in the client-side module, acquiring a current location or coordinates of a virtual character controlled by the player in the game space.

9. The method of claim 1, further comprising, in the client-side module, interpreting the seed to yield an identification of the scriptable object and one or more conditions to be met for spawning the scriptable object in the game space.

10. The method of claim 9, further comprising, in the client-side module, determining if the one or more conditions are met and, based on the one or more conditions being met, spawning the scriptable object.

11. The method of claim 10, further comprising, in the client-side module, accessing a locally stored instance of one or more data structures or related files in order to render the scriptable object.

12. The method of claim 9, further comprising, in the client-side module, determining if the one or more conditions are met and, based on the one or more conditions not being met, not spawning the scriptable object and discarding the seed.

13. The method of claim 10, further comprising, in the client-side module, determining if the one or more conditions are met and, based on the one or more conditions not being met, not spawning the scriptable object and discarding the seed.

14. The method of claim 10, further comprising, in the client-side module, comparing the player's current location or coordinates with a location of the spawned scriptable object to determine if the spawned scriptable object is close to the player's current location or coordinates.

15. The method of claim 14, further comprising, in the client-side module, when the spawned scriptable object is close to the player's current location or coordinates, activating the spawned scriptable object.

16. The method of claim 14, further comprising, in the client-side module, when the spawned scriptable object is not close to the player's current location or coordinates, not activating the spawned scriptable object.

* * * * *